US006985641B1

(12) United States Patent
Michel et al.

(10) Patent No.: US 6,985,641 B1
(45) Date of Patent: Jan. 10, 2006

(54) PICTURE PROCESSING METHOD AND APPARATUS

(75) Inventors: Xavier Michel, Tokyo (JP); Kazuhiko Ueda, Kanagawa (JP); Shiro Oomori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/574,900

(22) Filed: May 19, 2000

(30) Foreign Application Priority Data

May 26, 1999 (JP) ............................... P11-147248

(51) Int. Cl.
*G06K 9/32* (2006.01)

(52) U.S. Cl. ...................... 382/298; 345/660; 345/698; 348/581; 358/451; 708/208

(58) Field of Classification Search ........ 382/298–300, 382/305, 260, 261, 262, 263, 264, 265; 708/208
See application file for complete search history.

(56) References Cited

U.S. PATENT DOCUMENTS 4,275,450 A * 6/1981 Potter ......................... 382/298
4,484,347 A * 11/1984 Kashioka .................... 382/298
4,528,693 A * 7/1985 Pearson et al. ............. 382/299
4,578,812 A * 3/1986 Yui ............................ 382/300
4,610,026 A * 9/1986 Tabata et al. ............... 382/300
4,633,503 A * 12/1986 Hinman ...................... 382/299
4,701,808 A * 10/1987 Nagashima ................. 382/298
6,535,632 B1 * 3/2003 Park et al. .................. 382/164
6,611,618 B1 * 8/2003 Peli ............................ 382/260

OTHER PUBLICATIONS

Schultz et al, "A Bayesian Approach to Image Expansion for Improved Definition", May 1994, IEEE transaction and Image Processing, vol. 3, No. 3, pp. 233-242.*

* cited by examiner

*Primary Examiner*—Bhavesh M. Mehta
*Assistant Examiner*—Manav Seth
(74) *Attorney, Agent, or Firm*—Sonnenschein, Nath & Rosenthal LLP

(57) ABSTRACT

In a picture enlarging processing employing a MAP method, the processing volume is to be decreased to obtain a clear picture without producing blocked distortion without deteriorating the picture quality from that in the conventional practice. An energy function of a picture varied in dependence upon the input picture is defined in advance and stored. An input picture is enlarged, that is the number of pixels is increased, and a value which decreases the energy in a pixel of the enlarged picture is calculated. This energy decreasing value is added to the pixel and the pixel value is updated to adjust the picture quality to raise the resolution. The pixel value is updated a number of times to adjust the picture quality to raise the resolution.

16 Claims, 4 Drawing Sheets

| | | | | |
|---|---|---|---|---|
| $b^2$ | 0 | $b^2$ | 0 | $b^2$ |
| 0 | 2ab | 2ab | 2ab | 0 |
| $b^2$ | 2ab | $4a^2+8b^2$ | 2ab | $b^2$ |
| 0 | 2ab | 2ab | 2ab | 0 |
| $b^2$ | 0 | $b^2$ | 0 | $b^2$ |

PICTURE PROCESSING METHOD AND APPARATUS

BACKGROUND OF THE INVENTION

1. Field of the Invention

This invention relates to a picture processing method and apparatus in which, in a device handling picture data, such as a computer handling picture data, an electronic still camera, a recording device, an editing equipment or a display equipment, high resolution picture data can be outputted from input low-resolution picture data.

2. Description of Related Art

As computers, digital cameras or networks are becoming more popular, it is becoming a frequent practice to deform or correct picture data, captured on a computer, by a picture data processing software. In particular, picture enlargement and contraction is practiced routinely. Above all, in enlarging a picture, the method for enlargement, that is a method for interpolation, is at issue, such that, depending upon the enlargement method used, the enlarged picture is different in picture quality. Representative of the interpolation methods are a nearest neighbor, linear interpolation and cubic convolution.

The nearest neighbor method is equivalent to an order-zero holding, with the number of pixels increasing with picture enlargement. The value of pixels lying physically closest to a pixel present from the outset is directly used as the value of added pixels.

The linear interpolation method uses values of pixels present from the outset on upper and lower sides and on left and right sides and averaged with weights proportional to the distance.

The cubic convolution method uses linearly filtered values of distant pixels as the values of the added pixels.

The above methods may be used in combination with a method of enhancing edges after interpolation to improve subjective picture quality.

The above-described interpolation methods suffer from a defect that, although the number of pixels can be increased, the spatial resolution cannot be improved beyond that of the original picture, and that, since the interpolation is not that by an ideal filter, aliasing tends to be produced.

The nearest neighbor method has a defect that a picture is blocked due in particular to aliasing such that a picture representing an oblique line is stepped line picture.

The cubic convolution method is affected to a lesser extent by aliasing since the interpolation is close to that by an ideal filter. However, since the spatial resolution is not changed from that of the original picture, the picture gives an impression of a subjectively blurred picture.

The linear interpolation is a method compromised between the two methods, such that a picture produced is also compromised between the pictures obtained with these methods. That is, the produced picture gives a blurred impression and also suffers from blocked distortion.

These inconveniences are particularly objectionable with a higher enlargement ratio, such that an enlarged picture appears to be non-optimum when seen at a shorter distance.

For improving the blurred impression, edge enhancement may be used in combination. The most routine method for edge enhancement is to find a waveform of an order-two differentiation and to add a moderate amount of the differentiated waveform to the original waveform. Although the blurred impression is thereby improved, pre-shooting or over-shooting is likely to be produced.

Recently, proposal has been made of a method of converting standard television signals into HD signals of the high-vision television grade. This technique is not simple interpolation. Specifically, HD and SD signals, previously prepared from the same source, are used as training data, and a database is produced with the HD and SD signals associated with each other. When the SD signals are inputted, the data pace is lowered by way of performing non-linear processing to output HD signals. However, this method is limited to the case of doubling the multiplication in the vertical and horizontal directions, such that the method is difficult to apply for higher multiplication.

Thus, as a method for supppressing blocked distortion even in enlargement to larger multiplication and for producing as clear a picture as pssible, a method known as a MAP (maximum posteriori) in IEEE Transactions on Image Processing, vol. 3, no.3, pp. 233 to 242, 1994). This method processes a picture by the nearest neighbor method as a starting picture to produce a target picture. Specifically, the values of respective pixels are updated to approach to a natural picture on the assumtion that the natural picture is smooth everywhere. This processing is repeated several times. The degree of non-smoothness of an entire picture, termed smoothness, is used as an energy, and a picture is updated using the steepest descent method, so that this energy will be decreased. With this method, the blocked distortion is not perceived, with the produced picture being clearer than a picture obtained with the cubic convolution method. However, this method has a drawback that the processing is sluggish because of the use of the steepest descent method.

In the MAP method, it is crucial how an energy function representing the above energy is to be determined. Representative of such energy function is the Huber function which is proportionate to the square of the smoothness and to the smoothness when the energy is small, that is when the picture in its entirety is smooth, and when the energy is large, that is when the picture in its entirety is not smooth, respectively. The reason of using this form of the function is that, since sharp edges are inherently contained in a picture, the picture is to be prevented from being excessively smooth to protect the edge, that is that the state of high smoothness (non-smoothness) is to be the state of excessively high energy state to prevent the energy from being lowered to prevent the energy from being lowered by repetitive operation to lead to excessive smoothness.

However, with the Huber function, it is necessary to set a parameter of setting a switching point between the power of two and the power of one. An optimum value of this parameter differs from picture to picture and hence it is not advisable to set this value unequivocally.

The known MAP method is applied to enlargement by a factor equal to an integer number. Therefore, if enlargement by a factor corresponding to an optional number is desired, the MAP method can be combined with other methods. The other methods are known, and hence are not explained here and enlargement by a factor equal to an integer number only is explained.

First, enlargement of an input picture by a factor equal to q in the vertical and horizontal directions is considered. If a low resolution input picture of M×N pixels is Y, a high resolution output picture is X, a decimated matrix with a vertical to horizontal ratio equal to 1/q is T and the white Gaussian noise is n, the relationship of the equation 1:

$$Y = T \times X + n \tag{1}$$

holds, where T may be represented by the following equation (2):

$$T = \frac{1}{q^2}\begin{pmatrix} 1 \ldots 1 & 0 \ldots 0 & \ldots & & 0 \\ 0 \ldots 0 & 1 \ldots 1 & 0 \ldots & & 0 \\ \vdots & & \ddots & & \\ 0 & \ldots & & \ldots 0 & 1 \ldots 1 \end{pmatrix}. \quad (2)$$

Although it is desirable to find a high resolution output X from the equation (2), X exists infinitely, such that X cannot be found algebraically. Therefore, the following suppositions are made:

Supposition 1: A picture is assumed to be a Markov random field. That is, pixel values are present only in the vicinity without dependency upon an entire picture. This may be said to be a reasonable supposition in a natural picture.

Supposition 2: The probability of a picture is given by the Gibbs density fuction shown by the following equation (3):

$$Pr(X) = \frac{1}{C} e^{\frac{1}{\lambda} - \Sigma_{v \in V} S_V(X)} \quad (3)$$

where C is a constant for normalization and $S_v(X)$ is a function in a local point v in a picture for representing a value of smoothness (degree of non-smoothness). V denotes the entire picture and λ is a temperature parameter in the Gibbs function. This parameter is a constant and has no particular meaning.

The supposition 2 postulates that the smaller the smoothness, the higher is the probability, that is that a natural picture is approximately smooth. Therefore, this supposition may also be said to be reasonable.

On the other hand, if the noise added in producing an input picture is thought to be a Gaussian noise, the probability of the noise n may be represented by the following equation (4):

$$Pr(n)|_{n=Y-TX} = \frac{1}{(2\pi\sigma^2)^{\frac{NM}{2}}} e^{\frac{-\|Y-TX\|^2}{2\sigma^2}} \quad (4)$$

where σ is the standard deviation.

From the above model, an input is assumed to be a lowresolution picture Y, and deal high resolution picture X^ satisfying this supposition is found. From the above supposition, X^ maximizes Pr(X|Y). In general, Pr(X|Y) is represented by the equation (5):

$$Pr(X|Y)=Pr(Y|X)\times Pr(X)/Pr(Y) \quad (5)$$

where Y is the input picture and hence is known and Pr(Y)=1, while Pr(Y|X)= Pr(n). Therefore, Pr(Y|X) is represented by the following equation (6):

$$Pr(X|Y)=Pr(X)\times Pr(n) \quad (6).$$

That is, for finding X^, it suffices to maximize the equation (6). It is however obvious from the equations (6), (3) and (4) that it is sufficient if $\Sigma_{v \in v} S_v\hat{}(X)$ is minimized, as may be seen from the following equation (7):

$$\sum_{v \in V} \hat{S}_V(X) = \sum_{v \in V} S_V(X) + \beta\|Y - TX\|^2 \quad (7)$$

where β is a constant determined by trade-off between the smoothness $\Sigma s_v(X)$ and the constraint ||Y-TX||.

Now, the function $S_v(X)$, representing the smoothness, is defined. Since $S_v(X)$ is the local smoothness of a picture, the less smooth a picture, the larger must be the magnitude of the function. As a function that meets this condition, 3 vertically consecutive by 3 horizontally consecutive pixels as shown in FIG. 1 are considered and Sv(X) is defined as in the following equation (8):

$$S_v(X) = \sum_{k=0}^{3} h_k^2(X) \quad (8)$$

where $h_k(X)$ is a order-two FIR filter represented by the following equation (9):

$$h_0(X)=X_{i+1,j}-2X_{i,j}+X_{i-1,j}$$

$$h_1(X)=X_{i+1,j-1}-2X_{i,j}+X_{i,j+1}$$

$$h_2(X)=X_{i,j-1}-2X_{i,j}+X_{i,j+1}$$

$$h_3(X)=X_{i-1,j-1}-2X_{i,j}+X_{i+1,j+1} \quad (9)$$

If $S_v\hat{}$ (X) is defined in this manner, it is a scalar quantity contrary to a picture X which is a vector quantity.

Therefore, the equation 7 may be taken as an energy function determined by X. Next, the equation 7, as the energy function, is minimized. To this end, the well-known steepest descent method may be used. Suppose that, by m'th calculations, all pixel values are updated as shown by the following equation 10:

$$X_{m+1}=X_m-\alpha_m D_m \quad (10).$$

In the steepest descent method, since Dm is the gradient of the energy function, shown by the equation 11:

$$\nabla\left(\sum_{v \in V} \hat{S}_V(X)\right) = \nabla\left(\sum_{v \in V} \hat{S}_V(X)\right) + \nabla(\beta\|Y - TX\|^2) \quad (11)$$

this gradient must be found.

On the other hand, when the right side of the equation 10 is set as a uni-variable function $z(\alpha_m)$ having $\alpha_m$ as a variable, $\alpha_m$ is determined by finding such as $\alpha_m$ which minimizes $$\sum_{v \in v} Sv \wedge (z(\alpha_m))$$

This processing is repeated until $$\sum_{v \in v} Sv \wedge (X_m)$$

is substantially unchanged to find targeted X^.

Meanwhile, if this processing is repeated, the entire picture becomes smooth to approach to a natural picture. However, if a picture has abundant edges, these edged are also smoothed to give the impression of a blurred picture by way of an undesirable secondary effect. Therefore, the Huber function shown by the following equation (12):

$$\rho_T(X) = \begin{cases} X^2 & |X| \leq T \\ T^2 + 2T(|X| - T) & |X| > T \end{cases} \tag{12}$$

is used. FIG. 2 shows the function in a graphic form. Using this function, $S_v(X)$ is re-defined as in the following equation 13:

$$S_v(X) = \sum_{k=0}^{3} \rho_T(h_k(X)). \tag{13}$$

By so doing, the gradient in case of a large magnitude of $S_v(X)$ becomes smaller than in the equation 7, so that the degree of decrease of the value of the equation 7 by the steepest descent method is decreased. That is, the smoothness (degree of non-smoothness) is retained to prevent the edges in an edgy portion from becoming blurred to more than a necessary extent.

The foregoing is the explanation of the high definition technique by MAP so far known in the art.

So, in the MAP method, it is crucial how the energy function representing the above-mentioned energy is to be determined. To this end, the Huber function is preferentially used. This function is set so that it is proportional to the square of smoothness when the energy is small, that is when the picture in its entirety is smooth, while it is set so that it is proportional to smoothness when the energy is large, that is when the picture in its entirety is not smooth. The reason of doing this is that, since a picture inherently contains edges, excess smoothing needs to be prevented to protect the edges. Specifically, it is necessary to prevent the high smoothness state, that is the non-smooth state, from being converted to an excessively high energy state to prevent the energy from being lowered due to repetitive processing to bring about excess smoothness.

However, with the conventional MAP method, the picture energy is expressed by the Huber function, this energy being decreased by the steepest descent method. However, the calculations for finding a by the steepest descent method is expensive. On the other hand, it is necessary with the Huber function to define a parameter T determining a switching point between a power of 2 and a power of 1. However, this value is changed depending on a particular portion of a picture and hence it cannot be said to be optimum to set this value uniquely.

SUMMARY OF THE INVENTION

It is therefore an object of the present invention to decrease the amount of calculations, without deteriorating the picture quality in comparison with that in the conventional method, in case picture enlargement processing is to be performed in accordance with the MAP method, in order to avoid blocked distortion and in order to obtain a clear picture.

It is another object of the present invention to provide a method for edge protection without employing the Huber function which tends to deteriorate the picture quality when the parameter values are not appropriate.

Now, α is considered. This value α is a parameter used for decreasing the energy function. By properly determining this value depending on a particular picture, the speed until the state of convergence is remote, that is the number of times of repetition can be decreased. On the other hand, an optimum value of α is affected by the definition of the energy function, as discussed above, such that, if the definition of the energy function is changed, the optimum value of α differs, even if the processing is that for the same picture. Therefore, in the MAP method, an optimum value of α needs to be found from one repetitive processing to another. Since the processing volume for calculating the value α is large, it is advisable to render this processing efficient in order to decrease the overall processing volume.

Meanwhile, our experiments by the conventional MAP method with the use of variable pictures have revealed that, if the energy function is defined as in the equations 7 to 9, the number of times of repetition until convergence where no visual changes are noticed is on the order of three. This means that, since the gradation resolution of a human eye is 8 bits, that is 256 gradations, at most, such that an optimum picture is approached by three MAP processing operations, while subsequent changes as from this point are minute.

It has also been seen that, in this repetitive processing from the first to the third operations, the value ranges assumed by α are comprised in a pre-set constant range.

Thus, a mean value of the values assumed by α in each repetitive operation for the above-mentioned variable pictures is found. A mean value of α in an i'th processing is set as αave i. The processing for calculating α is not performed for the variable pictures and the value αave i is used for processing.

With this method, it may be feared that, since the value of α is not optimum, the rate of convergence is slower or not converged, such that it is oscillated with the minimum energy state as the center of oscillations.

However, since αave i is inherently close to an optimum value, it shows the converging process comparable to that in using an optimum value. If the converging rate is slow, the energy value is equivalent to that when the optimum α value is used, on the condition that the convergence occurs to the minimum energy state, such that the output picture quality is not vitally different from that with the use of the optimum α value. If oscillations occur ultimately, the energy is already close to the minimum value, the output picture quality is within the range of the gradation resolution of the human eye and hence is not problematical. So, the problem is solely the calculating cost, so that it is advisable to compare the cost in the processing for calculating α and in memory consumption to that incurred due to the increased number of repetitions to use a method which is more favorable in cost.

Our experiments have revealed that, if αave i is used, the number of repetitions until convergence is on the order of three, which is not changed from the number in case of calculating an optimum α value. This may be ascribable to the fact that αave i is a value close to the optimum value of α and that the standard of verifying the convergence is the visual properties of the order of 8 bits as discussed above. It is therefore apparent that the processing volume is smaller with the use of αave i, it being unnecessary to make cost comparison as discussed above. This, however, does not apply if the definition of the energy function is changed, in which case it may occur that the number of repetitions until convergence becomes larger than that in case of calculating α. In such case, cost comparison is required, as explained previously. However, since the rate of convergence is not vitally changed even though the processing volume in calculating α is large, it is in general more preferred to use αave i.

Moreover, considering that αave i is not changed significantly from one repetitive processing to another, an experiment was conducted using the same value of αave in each repetitive processing, without providing αave i consistent with i. The results of this experiment revealed that the number of times of repetition in this case was also on the order of three. It was thus found that αave may be used from one repetitive processing to another since it is more advantageous in processing cost than if an optimum value of α is calculated, while being slightly more advantageous than if αave i is used.

In this consideration, we have decided to define the energy function first and to find an average value of a for the respective repetitive operations by experiments on a large number of data or an average of values for the entire processing operations in advance to use this value for actual processing. By so doing, it is possible to omit the voluminous processing involved in calculating α from one actual repetitive processing operation to another.

We have also decided not to give judgment on the convergence conditions. Inherently, the value of the energy function is calculated from one repetitive processing to another, a difference is found from the result of the previous processing and the processing is terminated when the value is less than a pre-set value. However, if the energy function is defined as in the equations 7 to 9, convergence is achieved with three operations irrespective of the picture. If the energy function is defined otherwise, it is possible to discontinue the processing at a number of times of repetition in which discrimination is not possible, due to the human visual properties, as discussed above. The number of times until discrimination is impossible is previously determined, at a time point αave is determined, by processing variable pictures. This renders it possible to omit the calculations required in convergence judgment.

Meanwhile, the value of α, previously found, may also be a median value, instead of being an average value αave.

Also, in the Huber function, used for preventing the edge from becoming excessively smooth, it is difficult to determine the parameter T appropriately.

Therefore, smoothness S'v(X) is re-defined as in the equation 14:

$$S'_v(X) = \sum_{k=0}^{3} h'_k(X) \tag{14}$$

where $h'_k(X)$ is a dynamic value defined in the equation (15):

$$h'_0(X)=bX_{i+1,\,j}+aX_{i,,j}+bX_{i-1,j}$$

$$h'_1(X)=bX_{i+1,j-1}+aX_{i,j}+bX_{i-1,j+1}$$

$$h'_2(X)=bX_{i,j-1}+aX_{i,j}+bX_{i,j+1}$$

$$h'_3(X)=bX_{i-1,j-1}+aX_{i,j}+bX_{i+1,j+1} \tag{15}$$

in which a and b are changed with local picture values, that is a value determined by the equation (16):

$$a = a_0 e^{-\frac{S_v(X)^2}{2\sigma^2}} \text{ where } a_0 = -8, \text{ and}$$

$$a = b_0 e^{-\frac{S_v(X)^2}{2\sigma^2}} \text{ where } b_0 = 1. \tag{16}$$

In this case, since filter coefficients are changed with the local picture values, updating effects are changed depending on particular picture portions. With a large absolute value of Sv(X), that is if edge components are contained locally in large quantities, the values of $S'_v(X)$ or $\nabla S'_v(X)$ are not excessively increased to prevent edges from becoming excessively smoothed by updating. Conversely, should local edge components be small in quantities, with the picture being smooth, the values of $S'_v(X)$ or $\nabla S'_v(X)$ are not so small so that the effect of being smoothed on updating is not excessively small. That is, optimum results are achieved in keeping with features of particular picture portions.

As discussed above, the effect of edge protection is by the equation 14, while the equation 13 employing the Huber function is not used. This eliminates the necessity of considering the parameter T.

Thus, according to the present invention, the value of α is fixed and picture processing is performed using a dynamic filter instead of using the Huber function. This processing is repeated a pre-set number of times.

According to the present invention, an energy function of a picture is defined in advance and stored. An input picture is enlarged, that is the number of pixels is increased, and a gradient value of the energy function in the pixel of the enlarged picture is calculated. The product of the gradient value of the energy function with a value not dependent on the input picture is added to the pixel to update the pixel value to adjust the picture quality to raise the resolution. The pixel value is updated a number of times to adjust the picture quality to raise the resolution.

Moreover, according to the present invention, an energy function of a picture varied in dependence upon the input picture is defined in advance and stored. An input picture is enlarged, that is the number of pixels is increased, and a value which decreases the energy in the pixel of the enlarged picture is calculated. This energy decreasing value is added to the pixel and the pixel value is updated to adjust the picture quality to raise the resolution. The pixel value is updated a number of times to adjust the picture quality to raise the resolution.

According to the present invention, the picture obtained may be a clear high resolution picture without the picture suffering from the blocked distortion or becoming blurred due to insufficient spatial resolution. Moreover, the processing volume or the storage capacity needed in calculating the parameters can be diminished. By employing a dynamic filter, edge protection may be realized without using the Huber function in which picture quality deterioration is liable to be produced because of the difficulty encountered in optimizing the parameter T.

DESCRIPTION OF THE PREFERRED EMBODIMENTS

Figure 1:
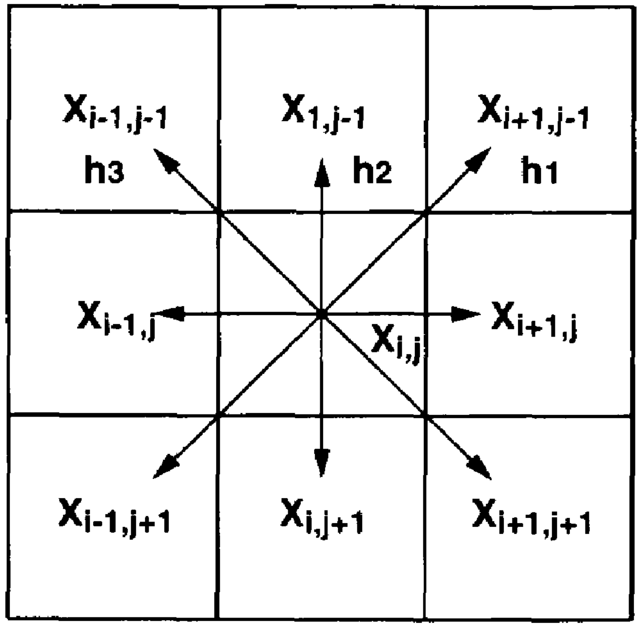
FIG. 1 illustrates an energy function used for finding an energy function which finds local smoothness of a picture.
Figure 2:
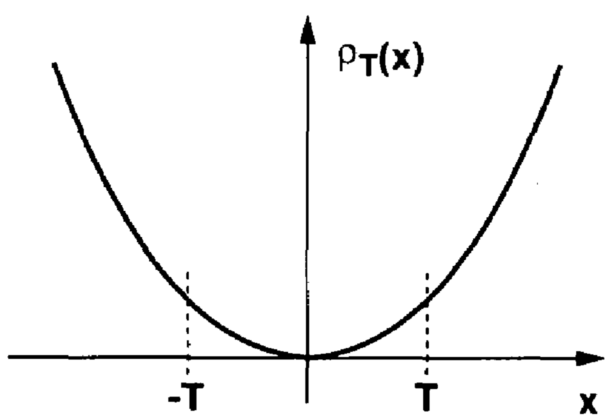
FIG. 2 show the Huber function $\rho_T(X)$.

Referring to the drawings, preferred embodiments of according to the present invention will be explained in detail.

Figure 3:
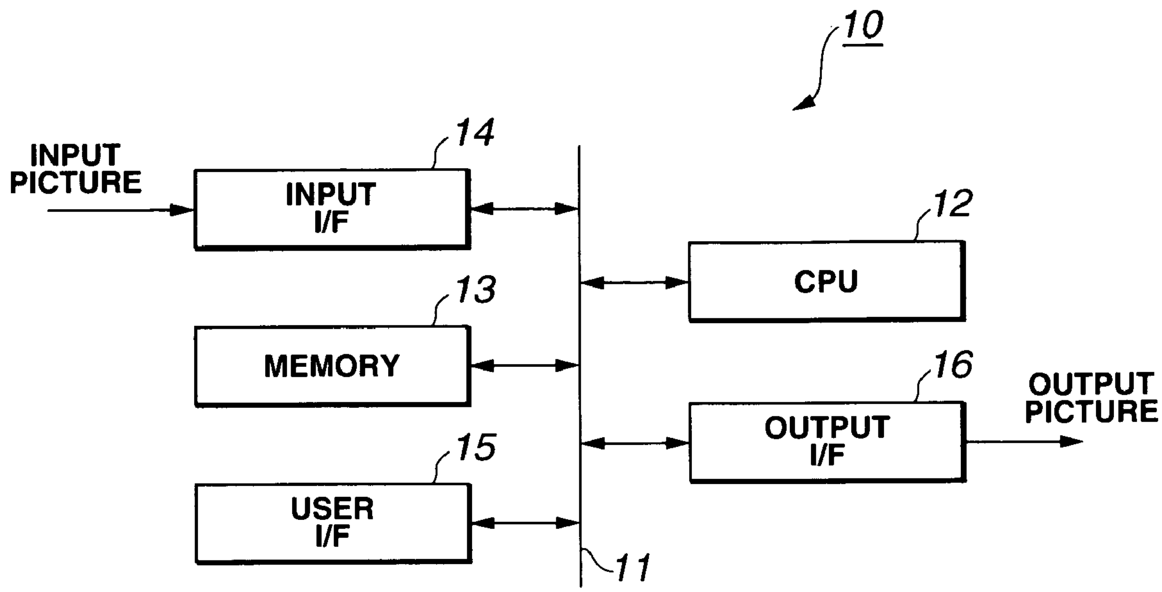
FIG. 3 schematically shows the structure of a picture processing apparatus embodying the present invention.

The present invention is applied to a picture processing apparatus 10 configured as shown in FIG. 3.

This picture processing apparatus 10 processes low resolution picture data, inputted via an input interface 14 by a central processing unit (CPU) 12 to generate high resolution picture data which is outputted via an output interface 16. The picture processing apparatus 10 is made up of a CPU 12, connected to an internal bus 11, a memory 13, an input interface 14, a user interface 15 and an output interface 16.

Figure 4:
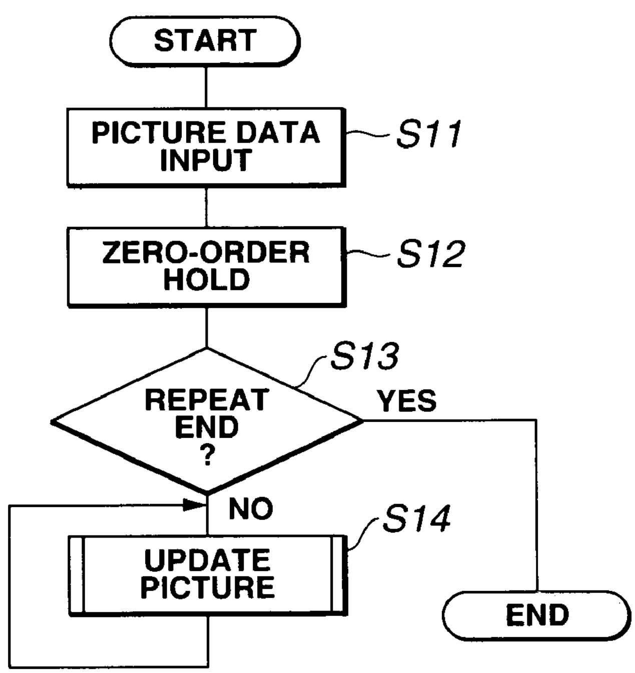
FIG. 4 is a flowchart showing a specified algorithm of picture processing in the picture processing apparatus shown in FIG. 3.

The algorithm of picture processing by the CPU 12 in the picture processing apparatus 10 is explained by a flowchart shown in FIG. 4.

First, at step S11, M×N pixel low resolution picture is inputted over the input interface 14. The input picture is a picture photographed by a CCD or stored in a hard disc, without regard to the picture furnishing source.

At step S12, the picture is enlarged by zero-order hold by a factor of q in both the vertical and horizontal directions. That is, the same pixel values are repeated for the vertical q by horizontal q pixels.

This picture is to be an initial picture. As the number of times of picture updating processing operations is verified at step S13, the picture updating processing is repeated at step S14 a pre-set number of times. This decreases the value of the equation 7 each time. At step S13, it is checked whether or not a pre-set number of times is reached. If the pre-set number of times is reached, the value of the equation 7 is close to a minimum value, with the value of each pixel being not changed. So, the processing is terminated to output the processed enlarged picture via the output interface 16. The output destination may be enumerated by a storage device having a recording medium, such as a tape or a hard disc, a next-stage signal processing circuit, a display device, such as VRAM or CRT, or an output device, such as a printer, without regard to the type of the output destination.

Figure 5:
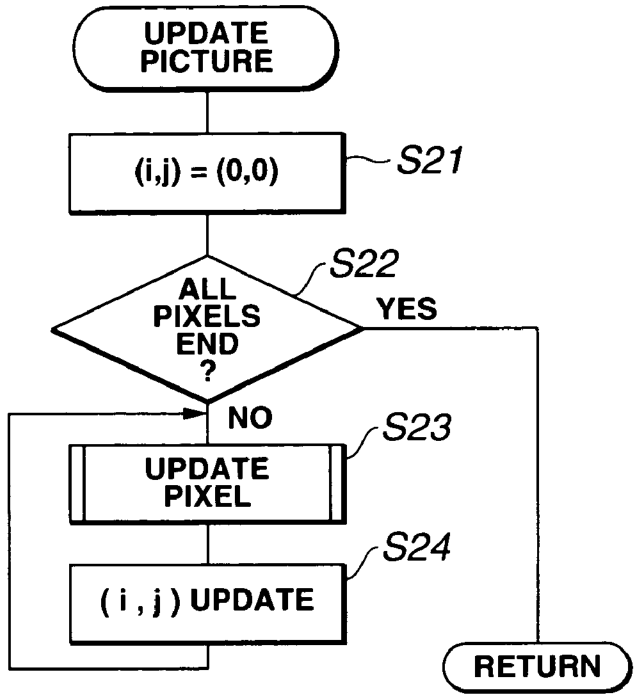
FIG. 5 is a flowchart for illustrating the picture updating in the picture processing of FIG. 4.

The picture updating processing at the above step S14 is specifically explained by a flowchart shown in FIG. 5.

First, at step S21, (i, j)=(0,0) is set to determine a pixel processed first. As it is checked at step S22 whether or not the pixel updating processing has come to a close for the entire pixels, the pixel updating processing is sequentially repeatedly performed at step S23 for each of qM by qN pixels.

At step S24, (i,j) is updated to determine the pixel processed next. At step S22, it is checked whether or not the pixel updating processing has come to a close for the entire pixels. If the pixel updating processing has come to a close, the pixel updating processing is terminated.

Since the pixel updating processing at step S23 is the processing accompanied by FIR filtering, special processing is required at a terminal portion of the picture. For this processing, routinely used methods are directly used. For example, in the terminal portions of the picture, a mirror image picture is assumed to continue to an outer side of the picture and, based on this assumption, processing is executed as if the terminal portions are not the terminal portions. Alternatively, pixel values are intermediate values between the zero and the maximum value, or processing is not performed on the terminal portions.

Figure 6:
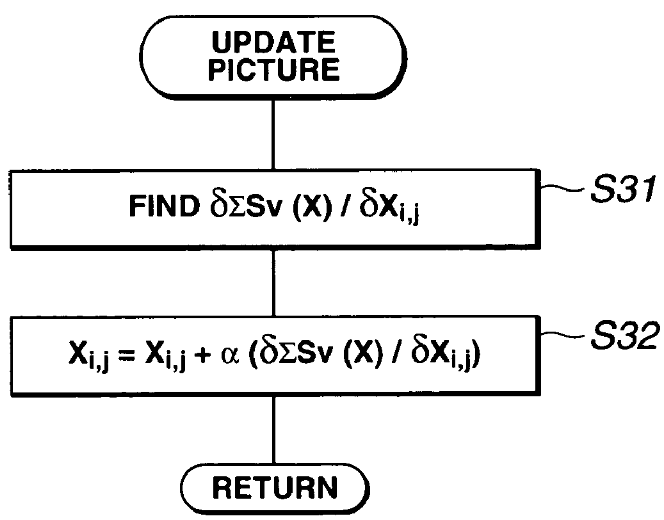
FIG. 6 is a flowchart for illustrating the pixel updating in the picture updating processing of FIG. 5.

Referring to the flowchart of FIG. 6, the pixel updating processing is now specifically explained.

In the pixel updating processing, $\nabla(\Sigma_{\nu\in\nu}(Sv\quad(X)))$ is found such as to decrease the energy function Σv∈vSvg (X), and is multiplied by a constant α to give $D_m$ to update the pixel value by the equation (10).

Specifically, $\nabla(\Sigma_{\nu\in\nu}(Sv\quad(X)))$ is found at step S31. This is a sum of $\nabla(\Sigma_{\nu\in\nu}(Sv\quad(X)))$ and $\nabla(\beta\|Y-Tx\|2)$, as shown by the equation 11.

Since the former is the partial derivative of a pixel $X_{i,j}$ of smoothness $\nabla(\Sigma_{\nu\epsilon\nu}(Sv\hat{}\ (X))$ of the entire picture, it is a partial derivative at $X_{i,j}$ in each $S_\nu(X)$ containing $X_{i,j}$ in the picture. If this is calculated, the result is a 5×5 FIR filter shown in FIG. 7.

The latter can be found on calculations, since β and T are constants, Y is an input picture and X is a current high resolution picture.

At the next step, the value found at step S31 is multiplied by a constant α and added to the current pixel value to give a new pixel value.

The above is the pixel updating processing. By this processing, the pixels are updated in a direction of decreasing the energy, that is smoothing a picture. However, since the energy is calculated by a dynamic filter, as shown in the equations 14 to 16 and in FIG. 7, there is no risk of edges from being excessively smoothed in an edgy portion.

The present invention is not limited to the above-described embodiments and may be modified in structure or application without departing from the principle of the pixel updating method. For example, although the software processing is presupposed in the foregoing description, it may be implemented by a hardware logic.

Figures 7, 8:
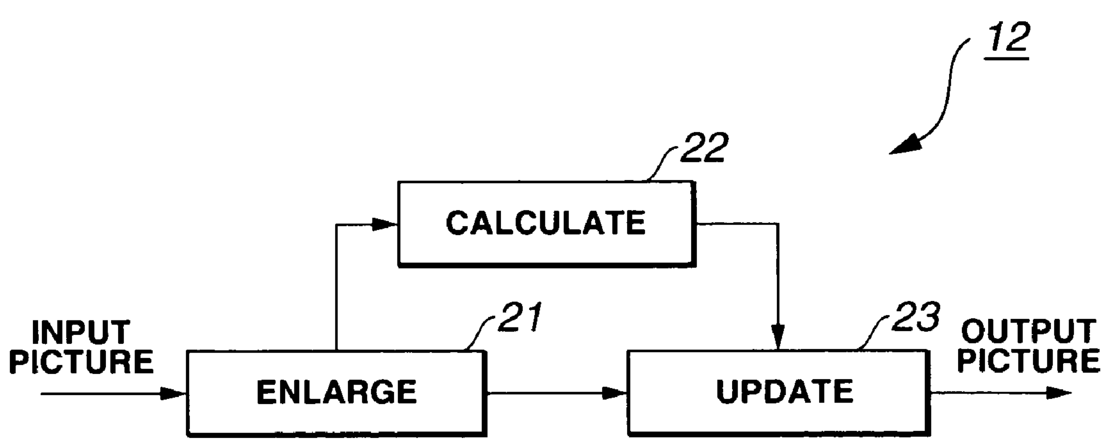
FIG. 7 shows a FIR filter used for finding the gradient of an energy function.
FIG. 8 is a block diagram for illustrating the functional structure of a central processing unit in the picture processing apparatus.

That is, referring to FIG. 8 showing the logical structure of the CPU 12 of the picture processing apparatus 10 for executing the picture processing algorithm, the CPU 12 may be replaced by an enlarging processing unit 21 for enlarging an input picture, a processing unit 22 for preparing an energy function of the picture in advance and for calculating gradient values of the energy function in a pixel of the enlarged picture, and an updating unit 23 for adding a constant number multiple of the gradient value of the energy function to the pixel to update the pixel value.

The present invention is not limited to enlarging an input picture. For example, in case of a picture with a large number of pixels not containing high frequency components, in which the spatial frequency is only up to an area that can be represented by one-half pixels in the vertical and horizontal directions, an input picture may be such a one having pixels decimated to one half in the vertical and horizontal directions and may subsequently be enlarged by a factor of two by zero order hold, in which case the high resolution may be realized with the number of pixels equal to that of the original picture. The present invention is not limited to processing accompanied by picture enlargement.

Of course, a picture derived from the order zero hold may be used as an input picture and the initial enlargement operation may be omitted. The present invention may also be applied to a picture portion. The enlargement ratio is not limited to two.

In the definition of the energy function of the present invention, an order two FIR filter is used. However, the coefficients or the number of orders are not limited to this example. In such case, the filter used for finding the gradient of the energy function is necessarily different from that shown in the foregoing description.

In the MAP method in general, discussions are made on a model which does not take the noise into account, or a model in which an updated picture is compared to an input picture every updating operation to provide a constraint condition. Since using a constant α value and not using the Huber function are the same as to the method of pixel updating, the present invention naturally may be applied to these models.

What is claimed is:

1. A picture processing method comprising the steps of:

preparing in advance a non-Huber function picture energy function that does not contain a Huber function;

preparing an enlarged input picture;

calculating gradient values of said energy function for a pixel in the enlarged picture;

adding together a sum of the gradient values of said energy function and a value not dependent on the input picture to said pixel; and updating a value of said pixel for picture quality adjustment using the result of said addition.

2. The picture processing method according to claim 1 wherein the updating processing of the pixel value is repeated a plurality of number of times.

3. The picture processing method according to claim 1 wherein said value not dependent on the input picture is determined in advance from a plurality of pixels.

4. A picture processing method comprising the steps of:

preparing in advance a non-Huber function picture energy function varied depending on an input picture that does not contain a Huber function;

preparing an enlarged input picture;

calculating a value which decreases said energy function for a pixel of the enlarged picture;

adding said energy decreasing value to said pixel; and updating a value of said pixel for picture quality adjustment using the result of said addition.

5. The picture processing method according to claim 4 wherein the energy function of the picture varied depending on the input picture is the sum total of the pixel energies changed with pixel values of plural pixels in the vicinity of each pixel.

6. The picture processing method according to claim 4 wherein the energy decreasing value is a product of a gradient value of the energy function in the pixel of the enlarged picture with the value not dependent on the input picture.

7. The picture processing method according to claim 4 wherein the updating processing of the pixel value is repeated a plurality of number of times.

8. A picture processing method comprising the steps of:

a first step of preparing in advance a non-Huber function picture energy function that does not contain a Huber function and preparing an enlarged input picture;

a second step of calculating a value which decreases said energy function for a pixel in the enlarged picture; and a third step of adding said energy decreasing value to said pixel;

said second to third steps being repeated a pre-set number of times.

9. A picture processing apparatus comprising:

holding means for holding a non-Huber function picture energy function, that does not contain a Huber function prepared in advance;

enlarging means for enlarging an input picture;

calculating means for calculating a gradient values of said energy function for a pixel in the enlarged picture; and updating means for adding to said pixel a product of the gradient values of said energy function with a value not dependent on the input picture and for updating the resulting value of said pixel based on the results of said addition.

10. The picture processing apparatus according to claim 9 wherein the calculating processing by said calculating means and the updating processing by said updating means are repeated a plurality of number of times.

11. The picture processing apparatus according to claim 9 wherein said value not dependent on the input picture is found in advance from a plurality of pixels.

12. A picture processing apparatus comprising:

holding means for holding a non-Huber function picture energy function, that does not contain a Huber function, prepared in advance and varied depending on an input picture;

enlarging means for enlarging the input picture;

calculating means for calculating an energy decreasing value for a pixel in the enlarged picture using said energy function; and updating means for adding said energy decreasing value to said pixel and for updating the resulting pixel value.

13. The picture processing apparatus according to claim 12 wherein said holding means holds the sum total of pixel energies varied depending on pixel values of plural pixels in the vicinity of each pixel as a function of the energy of the picture varied depending on said input picture.

14. The picture processing apparatus according to claim 12 wherein said updating means adds a product of a gradient value of said energy function in a pixel in the enlarged picture with a value not dependent on the input picture as said energy decreasing value to said pixel.

15. The picture processing apparatus according to claim 12 wherein said calculating operation by said calculating means and said updating operation by said updating means are repeated a plurality of number of times.

16. A picture processing apparatus comprising:

holding means for holding a non-Huber function picture energy function, that does not contain a Huber function, prepared in advance;

enlarging means for enlarging an input picture;

calculating means for calculating an energy decreasing value for a pixel of the picture enlarged by said enlarging means using said energy function; and updating means for adding said energy decreasing value to said pixel to update the pixel value;

said calculation operation by said calculating means and the updating operation by said updating means being repeated a pre-set number of times.

* * * * *